Nov. 25, 1924.                                    1,516,598
R. T. GRIFFITHS
PRINTING SHEET RUBBER
Filed Dec. 9, 1921
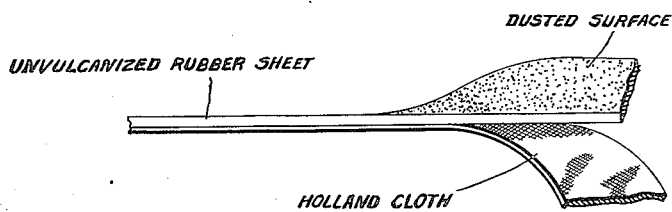
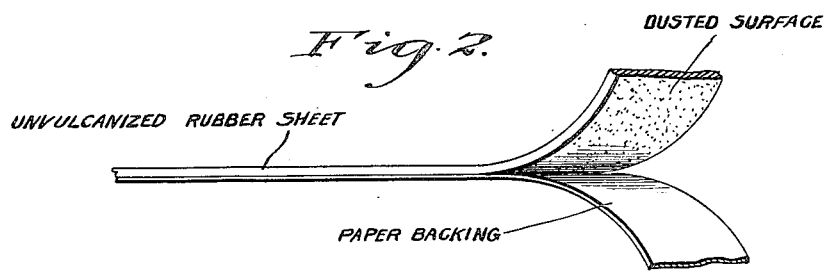
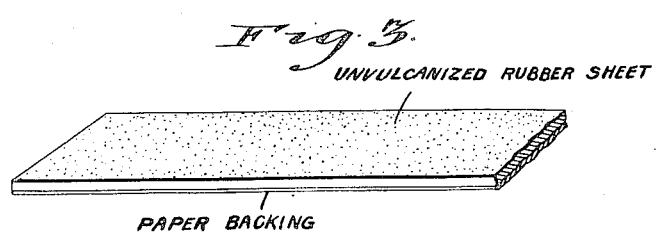
Inventor
Richard T. Griffiths
By Spear Middleton Donaldson & Hall
Attorney Patented Nov. 25, 1924.

1,516,598

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

PRINTING SHEET RUBBER.

Application filed December 9, 1921. Serial No. 521,220.

*To all whom it may concern:*

Be it known that I, RICHARD T. GRIFFITHS, a citizen of the United States, and resident of Akron, in the county of Summit and State of Ohio, have invented certain new and useful Improvements in Printing Sheet Rubber, of which the following is a specification.

My present invention relates to an improved method of ornamenting rubber sheets and particularly to thin sheets of uncured rubber stock such as are used in manufacturing various articles as for example rubber balls.

Uncured rubber sheets have heretofore been found very difficult to ornament and especially so by printing designs thereon by the use of known forms of printing presses due to the fact that it is almost impossible to handle the sheets without stretching or distorting them, the rubber in its uncured condition being sticky or tacky, being easily stretched or pulled out of shape, being of a flaccid nature, and having little elasticity tending to restore it to its original condition and for this reason the printing of multi-color designs has been absolutely prohibited owing to the impossibility of securing exact register in the successive impressions and of causing the sheets to stand in the press without collapsing.

The present invention aims to avoid these objections and to provide a method by which such uncured sheets may be easily and accurately provided with ornamental designs of one or a plurality of colors, and the invention includes the novel method hereinafter described and particularly defined by the appended claims.

In order that my invention may be better understood, I have appended hereto a drawing illustrating the steps of carrying out the method.

In this drawing:—

Figure 1 illustrates an unvulcanized rubber sheet overlying a strip of holland cloth, the layers being separated at one end and turned for clearness of illustration.

Fig. 2 is a similar view showing the unvulcanized sheet after removal of the Holland cloth and with the paper backing applied.

Fig. 3 is a perspective view showing a portion of a sheet with the paper backing applied and the unvulcanized dusted surface in readiness for receiving the printing operation.

In these several figures descriptive legends are applied in lieu of reference characters.

According to the present invention a sheet of rubber stock of the desired thickness is run on an ordinary calender and laid on a sheet of (preferably) Holland cloth which constitutes a backing therefor, the exposed side being (preferably) dusted so as not to be tacky or sticky. After cooling the Holland is removed, exposing the undusted side which is then dusted very lightly.

A sheet of paper is then applied to the lightly dusted side and pressed in intimate contact therewith throughout its entire extent. The light dusting serves to prevent the rubber from sticking too tightly to the paper to interfere with its being readily stripped or peeled therefrom, while at the same time the adherence is sufficient to enable the composite sheet to be readily handled, stretching of the rubber being prevented by the paper backing.

The sheets of rubber and paper may be conveniently juxtaposed by interwinding on a suitable mandrel or drum.

The designs to be applied or imprinted on the rubber are preferably composed of suitably colored rubber composition or rubber inks and where the ornamenting is accomplished by a printing press using one or more colored inks, such ink (or inks) is (or are) of suitably colored rubber composition which, after application, will be united permanently to the rubber sheet by vulcanization.

I have found that the surface of the rubber sheet to be ornamented should be dusted with a material which will not prevent the intimate union of the design stocks and sheet stock, or in other words which will not form a separating layer, and for this purpose I have found sulphur a suitable material, as while it removes the tackiness or stickiness of the surface, and thus facilitates the handling and application of the design, the sulphur, upon application of the vulcanizing heat, becomes incorporated in the rubber and facilitates the permanent union of the rubber sheet and ornamenting material.

If the ornamenting is to be done by a printing press the rubber sheet with its paper backing is run through a suitable press of single or multi-color character as desired and thereafter the rubber sheet is stripped from the paper backing and vulcanized in the usual manner.

While sheets of size and shape corresponding to the individual article to be made therefrom can be handled in the above mentioned manner it is of course more convenient to handle the rubber in large sheets from which a plurality of article forming blanks are cut, and by cutting through the rubber only, leaving the paper uncut, the scrap rubber between the articles may be readily peeled off, leaving the cut out ornamented articles on the paper to be removed subsequently or separately. In this way destruction of the paper is avoided and the rubber scrap is kept free from paper scrap and may be reworked into fresh sheets.

The cutting may be conveniently effected directly on the press by the application of cutting dies to the press cylinder or type bed arranged so as to penetrate the rubber only.

Having thus described my invention what I claim is:

1. The hereindescribed method of ornamenting rubber sheets which consists in removably juxtaposing a sheet of rubber and a smooth flexible backing, dusting the exposed surface of the rubber with a powder of a character which will incorporate with the rubber upon application of vulcanizing heat, applying design forming material to said dusted surface, and finally vulcanizing the article.

2. The hereindescribed method of ornamenting rubber sheets which consists in removably juxtaposing a sheet of rubber and a smooth flexible backing, dusting the exposed surface of the rubber with powdered sulphur, applying an ornamental design to said sulphured surface, and vulcanizing the rubber sheet.

3. The hereindescribed method which consists in applying to the surface of a rubber sheet a dusting of powdered material which will on vulcanization become incorporated in the rubber, applying to such dusted surface an ornament of rubber composition, and subjecting the ornamented sheet to vulcanization.

4. The hereindescribed method which consists in applying to the surface of a rubber sheet a sprinkling of sulphur, applying to said sprinkled surface ornamental material of rubber composition of contrasting color, and subjecting the whole to vulcanizing heat.

5. The hereindescribed method of ornamenting rubber sheets which consists in removably juxtaposing a sheet of rubber and a smooth flexible backing, applying to the exposed surface of the rubber a thin coating of non-adhesive material of a character which will incorporate with the rubber upon application of heat, applying design forming material to said coated surface, and finally vulcanizing said sheet.

6. The hereindescribed method which consists in mounting a sheet of vulcanizable rubber compound removably upon a non-stretchable flexible backing, printing a plurality of designs of ornamental matter on the exposed surface of said rubber sheet while held against distortion by said backing, cutting the rubber sheet around said designs, and separately removing the design bearing portions and the intervening scrap portions from said backing.

In testimony whereof, I affix my signature.

RICHARD T. GRIFFITHS.